United States Patent [19]

Heger et al.

[11] 4,347,590

[45] Aug. 31, 1982

[54] AREA SURVEILLANCE SYSTEM

[76] Inventors: Vernon G. Heger, 3517 Albatross; Henri J. A. Charmasson, 2030 Sunset Blvd., both of San Diego, Calif. 92103

[21] Appl. No.: 126,579

[22] Filed: Mar. 3, 1980

[51] Int. Cl.³ .................... G03B 3/00; G08B 13/16
[52] U.S. Cl. ..................... 367/93; 340/691; 354/25; 354/195
[58] Field of Search ............ 367/93, 94; 354/25, 354/163, 195; 340/691, 541

[56] References Cited

U.S. PATENT DOCUMENTS

| | | | |
|---|---|---|---|
| 2,785,395 | 3/1957 | Platzman | 367/94 X |
| 3,431,550 | 3/1969 | Spence | 367/93 |
| 3,634,846 | 1/1972 | Fogiel | 340/691 X |
| 3,781,772 | 12/1973 | Inoue et al. | 367/93 |
| 4,166,273 | 8/1979 | Riley, Jr. et al. | 340/541 X |
| 4,199,244 | 4/1980 | Shenk | 354/25 |
| 4,199,246 | 4/1980 | Muggli | 354/25 |
| 4,200,378 | 4/1980 | Shenk | 354/25 |
| 4,242,743 | 12/1980 | Salem | 367/93 |

Primary Examiner—John W. Caldwell, Sr.
Assistant Examiner—Joseph E. Nowicki
Attorney, Agent, or Firm—Henri J. A. Charmasson

[57] ABSTRACT

An area surveillance system which combines an ultrasonic intrusion detector, an electronic range finder, an instant camera and an alarm. The system is packaged in a temper-proof housing and is particularly suitable for the protection of residential and commercial buildings and for providing a quick identification of intruders. The output of the range finder is used to focus the camera objective on the intruding subject. After focusing a series of pictures of the area are taken. The pictures are readily available for early identification of the intruder. By means of an interface programming device, immediate or delayed silent and/or audible alarms are triggered upon detection of the intruder.

2 Claims, 9 Drawing Figures

CODED POWER SWITCH

AREA SURVEILLANCE SYSTEM

BACKGROUND OF THE INVENTION

This invention relates to so-called burglar alarms and intrusion detection systems. It also relates to photographic and cinematographic surveillance systems. The classic burglar alarm system is commonly designed to trigger audible and/or silent alarms. The audible alarm is designed to scare the intruder away and to alert anyone within its hearing range. The silent alarm is usually triggered at the command post of a security office or at the police station. The major drawback of this type of system is the time delay between the detection of the intrusion and the arrival of the police or security force. This type of system does not provide any evidence about the identity of the intruder. Consequently, the apprehension rate in most residential and commercial burglaries is very low.

Optical imaging and recording systems which can provide an identification of the trespasser use video or movie cameras which operate on a continuous base in the surveillance of bank lobbies, jewelry stores and other sensitive locations.

PRIOR ART

Burglar alarms and intrusion detection systems which utilize ultrasonic sensors are well known as evidenced by U.S. Pat. No. 3,383,678, Palmer; U.S. Pat. No. 3,793,617, Tolman; U.S. Pat. No. 4,003,045, Stockdale; and U.S. Pat. No. 4,123,748, Otani. A range finding and focusing system for cameras which is closely related to this invention is disclosed in U.S. Pat. No. 3,522,764, Biber, et al.

SUMMARY OF THE INVENTION

The principal object of this invention is to provide an interface between an intrusion detector and an optical imaging and recording system. Another object of this invention is to provide a convenient and readily available photographic identification of an intruder. A further object of the invention is to provide an electronic means for rapidly focusing a camera upon a moving target. Yet another object of the invention is to provide a picture-taking and alarm-sounding intrusion detector which gives the user a choice in the sequencing of events such as picture-taking, local audible alarm sounding and triggering of remote or silent alarms. It is also an object of the invention to provide such an intrusion detection based upon the use of a standard instant picture camera. These and other objects are achieved by coupling an instant picture camera to an ultrasonic movement detector and range finding device and to a variety of alarm triggering relays. The output of the range finder is used to focus the camera on the moving target before taking pictures. An interface programming device provides for the user's selection of the type of alarm, and the sequence between picture-taking and alarm triggering functions.

DETAILED DESCRIPTION OF THE PREFERRED EMBODIMENT

Figure 1:
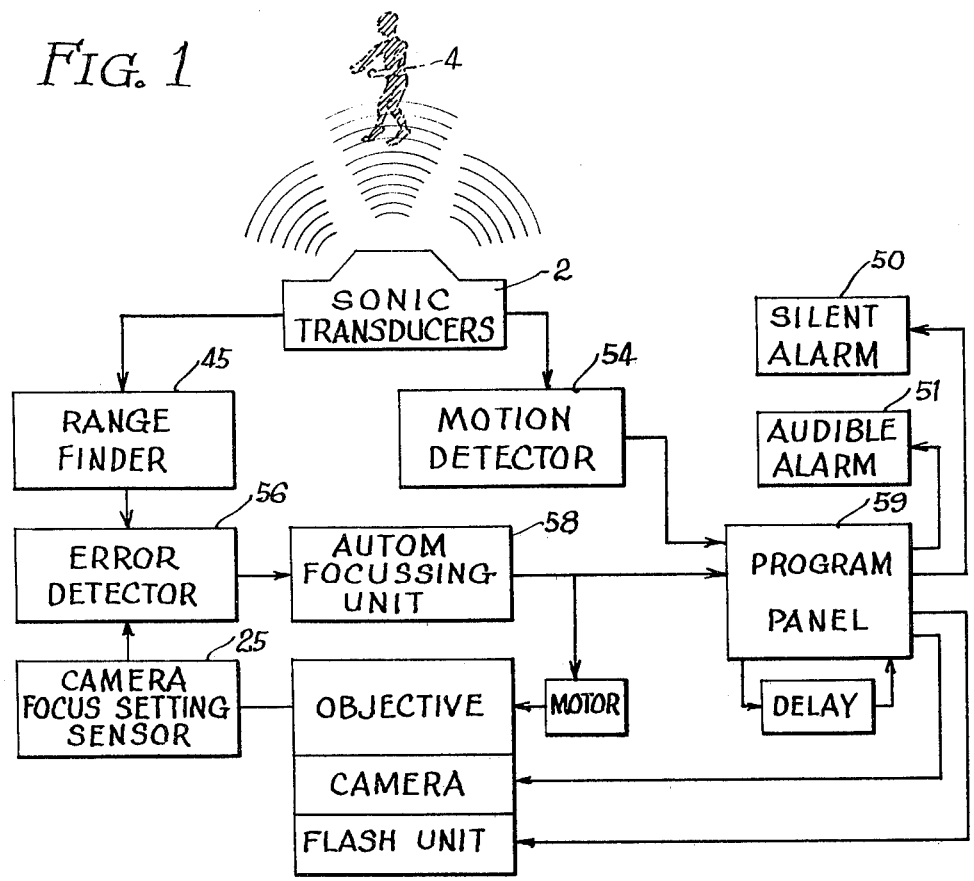
FIG. 1 is the general block diagram of the system.

Referring now to the drawing and according to the invention a block diagram of the preferred embodiment is shown in FIG. 1. The movement of an intruder 4 as it enters the area covered by the beam transmitted from the sonic transducers 2 is detected by motion detector 54 and the distance between the sonic transducers 2 and the moving target 4 is computed in the range finder 45. The current focus setting of the camera 5 is compared in the error detector 56 to the distance derived from the range finder 45. The error signal is used in the auto-focusing unit 58 to drive the objective 7 of the camera to the required focus setting. The triggering of the camera 5, flash unit 9, and silent alarm 50 and the sounding of the audible alarm 51 may be programmed by means of the interface programmable panel 59 to occur either as soon as any movement in the monitored area is sensed by the motion detector 54 or after the auto focusing sequence of the camera 5 is completed. An adjustable delay unit 60 can be also programmed between one of the triggering signals and any one of the triggered devices.

Figure 2:
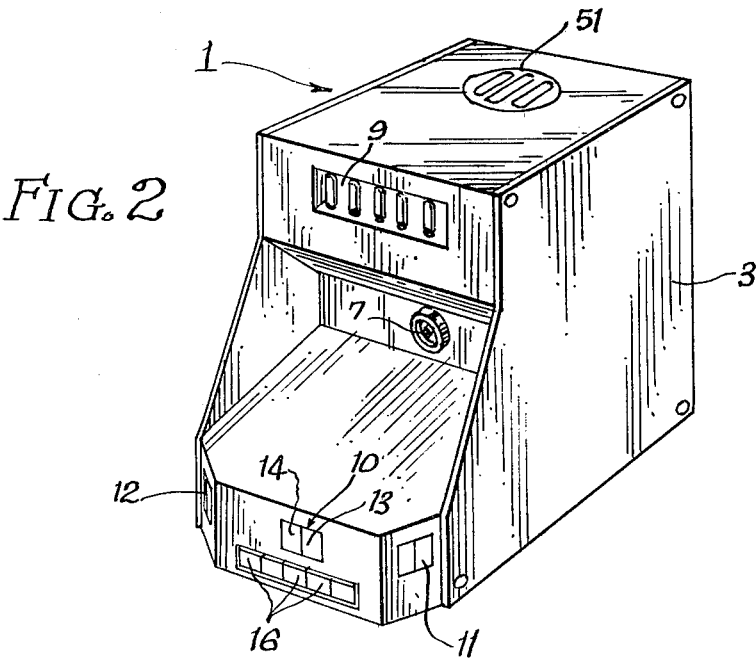
FIG. 2 is a perspective view of the intruder detection and identification system.
Figure 3:
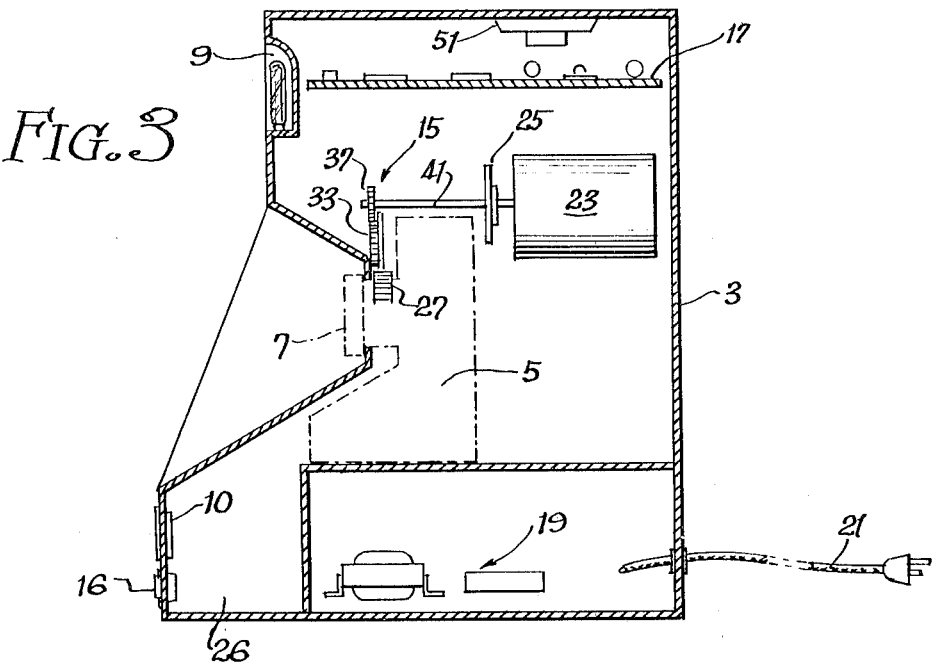
FIG. 3 is a cross sectional view thereof.
Figure 4:
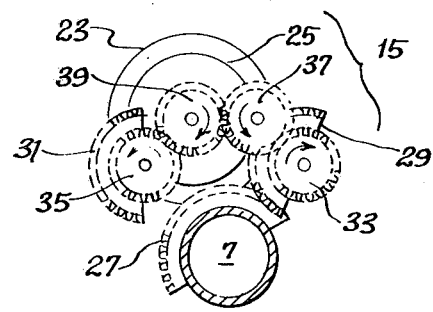
FIG. 4 is a diagram of the focusing clockwork giving a frontal view of the gears.
Figure 5:
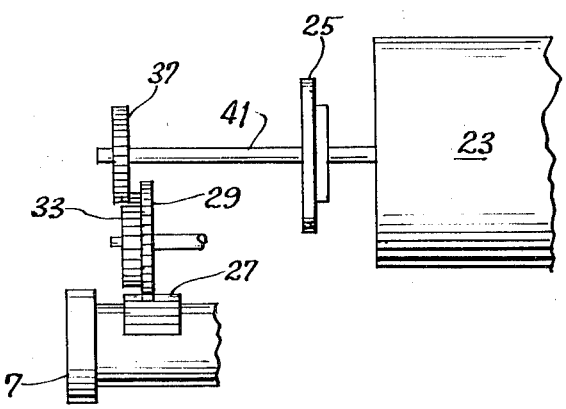
FIG. 5 is a side view diagram of the clockwork.

Referring now to FIGS. 2 and 3, the intruder detection and identification device, which is built around the instant picture type camera 5, is packaged in a sealed housing 3. A flash station 9 on the upper front face of the housing 3 can accommodate five flashbulbs. The objective 7 of the camera 5 is focused by means of a clockwork 15 driven by an electrical motor 23. The operation of the device is controlled by an electronic circuit packaged on a printed circuit board 17. A power supply board 19 in the lower part of the housing 3 comprises several rechargeable batteries and can be connected to a household electrical outlet by means of a power cord 21. A small compartment 26 in the lower front part of the housing 3 is designed to receive the pictures ejected by the camera 5. On the front face of the housing a set of numbered pushbuttons 16 provide a coded switch for turning the unit on or off. Three ultrasonic sensors 10, 11 and 12 are positioned to provide effective surveillance over approximately a 200° range in front of the unit. Each ultrasonic sensor comprises a transmitter 13 and a receiver 14. The clockwork 15 controls the focusing of the objective 7 by means of a unidirectional motor 23. The clockwork, more specifically illustrated in FIGS. 4 and 5, comprises a semi-circular gear 27 mounted around the objective 7. The gear 27 comes in contact alternately with two semi-circular gears 29 and 31 turning in opposite directions. The objective 7 is therefore rocked alternately right and left as the gear 27 is engaged by either one of the two semi-circular gears 29 or 31. Two smaller spur gears 33 and 35 mounted on the same axis as gears 29 and 31 are coupled to the main shaft 41 of the motor 23 by means of intermediary coupling gears 37 and 39. On the motor shaft 41 a focus-setting detector switch 25 has a series of ports contacted by a common sweep arm. This switch 25 is used to provide the electronic circuit with an indication of the position of the objective 7. Although only four ports are shown for switch 25, their number may be increased according to the type of objective and the depth of the field to be monitored.

The device is designed to be installed at one end of the area to be monitored. As long as there is no movement within the range of surveillance, the apparatus remains inactive. An intrusion is detected any time a moving object is impinged by the beam emitted from any one of the three ultrasonic sensors 10, 11 or 12. It should be noted, however, that the camera will not be triggered until the moving body is detected through the central electronic ultra sensor 10. In the standby mode, the objective 7 of the camera is usually focused on the nearest object in its field of vision, usually the farther wall. In this preferred embodiment of the invention the camera may be triggered every time the objective is refocused. Consequently, a series of pictures may be taken sequentially as the intruder moves within the area surveyed by ultrasonic sensor 10. In the case when an automatic camera is used which has its own built-in auto-focusing device, the system may be programmed to trigger such a camera as soon as a movement is detected, as will be explained later. The unit may also be programmed to trigger an audible alarm 51 and/or to provide switch closures for triggering a silent alarm or remotely installed audible alarm. The flash unit, or a remote flash, can also be energized every time the camera 5 is triggered.

Figure 6:
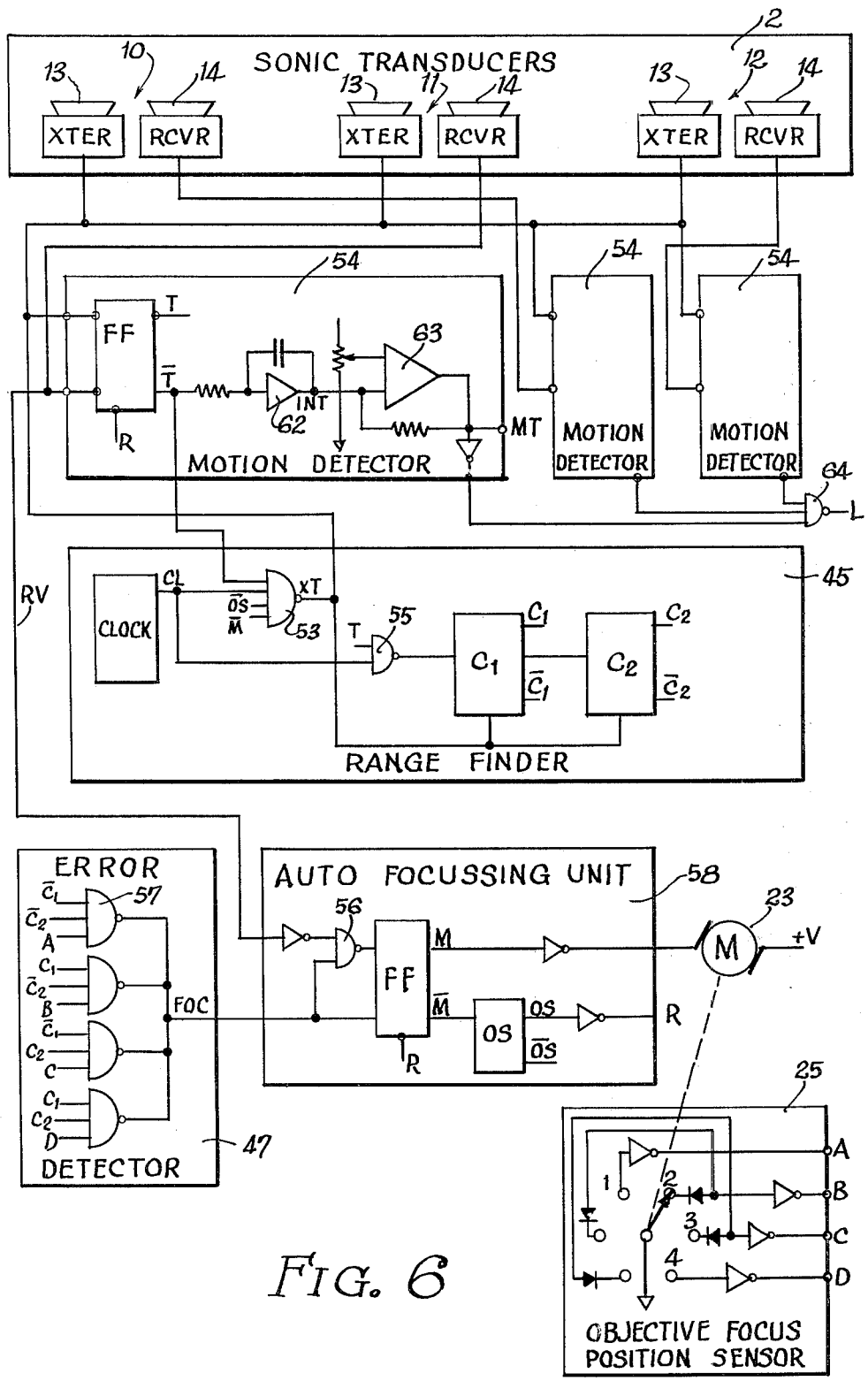
FIG. 6 is an electrical schematic of the system.
Figure 7:
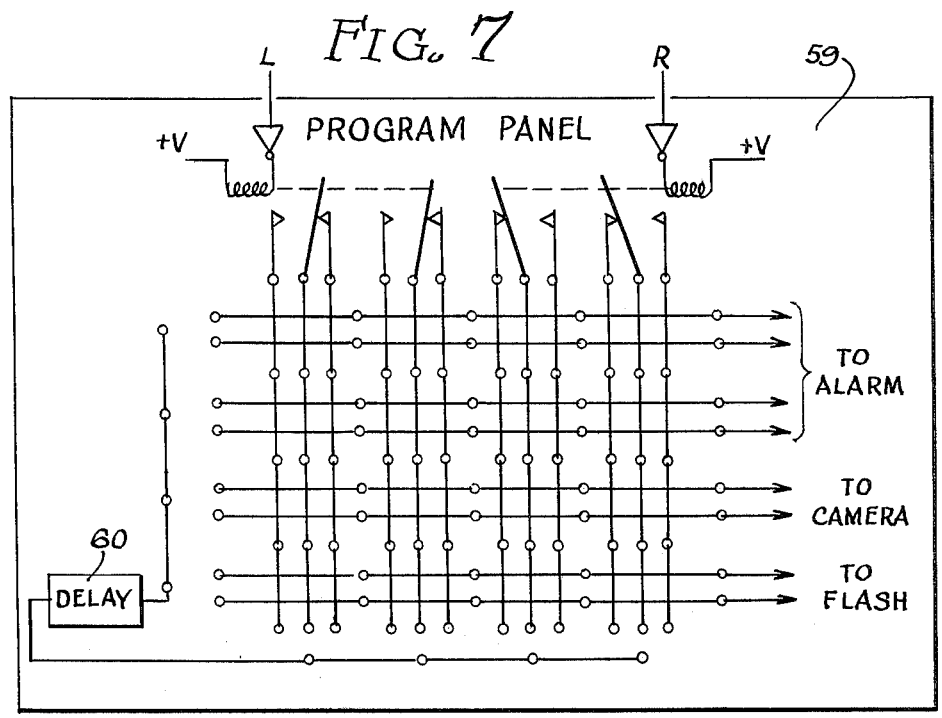
FIG. 7 is the electrical schematic of the coded power switch and program panel.
Figure 8:
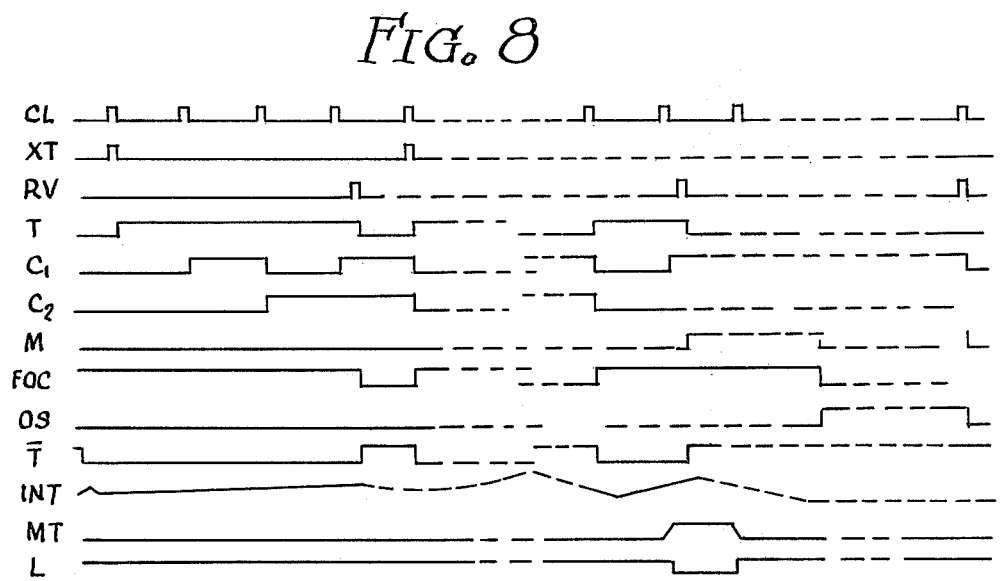
FIG. 8 is a flow diagram giving waveforms at the various points of the electrical circuit.
Figure 9:
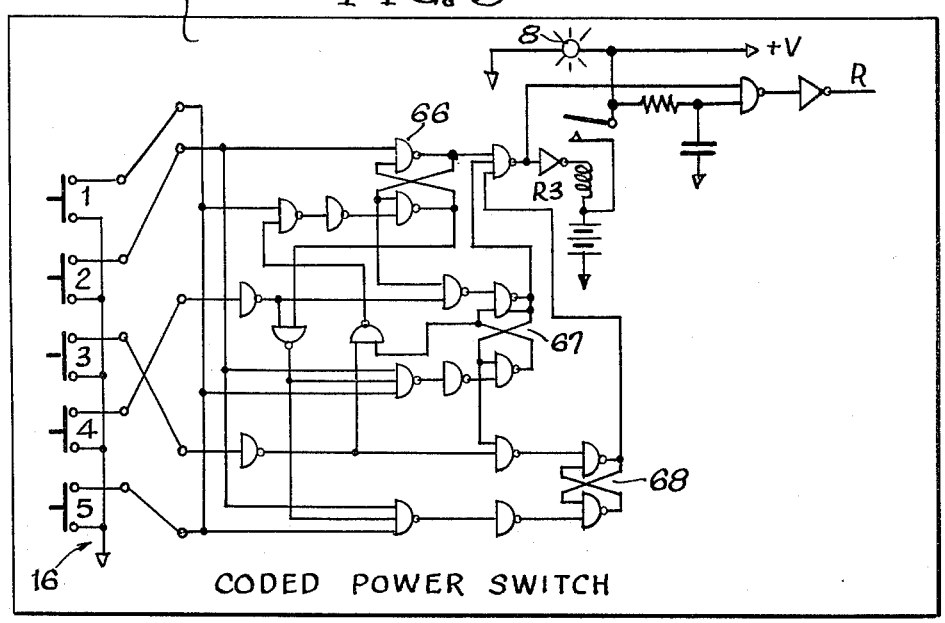
FIG. 9 is a schematic of the coded power switch.

The operation of the camera 5 is illustrated in the block diagram of FIGS. 6 and 7. The focusing position of the objective 7 is indicated by the objective location sensor 25. The error detector 47 senses the difference between the output of the objective location sensor 25 and the output of the range finder 45. If the two inputs are not matched, a signal is sent to the auto-focusing unit 58 which energizes the motor 23, thus driving the objective 7 toward the new focusing position. When the objective is focused on the required distance, the motor is stopped and a trigger signal is sent via the control panel 59 to the camera 5, the flash unit 9, and/or the alarms 50 and 51. The objective location sensor 25 is a multi-port rotary switch mounted on the shaft 41 of the motor 23. In this preferred embodiment of the invention, four positions of the objective as indicated by signal A, B, C and D, are recognized. If gears 33, 35, 37 and 39 are of the same size, the full focusing range of the objective 7 is scanned for each turn of the motor 23. Signal A represents the minimum focusing distance; while signal D represents the longest focusing distance of the camera. The range finder 45 comprises an oscillating clock producing a periodical pulse signal CL which is used to drive the ultrasonic transmitters 13 through gate 53. The receiver 14 of the central sensor 10 detects the echo of the ultrasonic signal bouncing back from the nearest object in front of the camera 5. Flip-flop T in the motion detector 54 is triggered every time a signal is sent out, and reset when the echo is detected. Therefore, the signal T is proportional to twice the distance between the camera and the object upon which the objective 7 must be focused. The signal T is used to enable the passage of clock pulses CL to a counter by means of gates 55. In the preferred embodiment of the invention, the counter is a binary, two-stage type which can detect up to four clock pulses. The counter capacity must correspond to the number of ports on the focus location detector 25. During the counting period, gate 53 is inhibited, preventing the emission of further ultrasonic signals. At the end of the counting period, the count accumulated in the counter represents the focusing distance. At that point, the counter does not match the output of the focus location sensor 25, the motor control flip-flop M of the auto-focusing unit 58 is set by the echo signal RV through gate 56. The output of the flip-flop M is fed to a driver which energizes the motor 23. As the motor drives the objective 7 the outputs A, B, C, D of the objective location sensor 25 are compared to the count held in the counter in a series of comparator gates 57 of the error detector 47. As soon as the objective reaches the focusing position corresponding to the value accumulated in the counter, the signal FOC from the error detector 47 resets the flip-flop M and inhibits gates 56. The motor 23 is immediately stopped and a uni-junction one shot OS is triggered. The output of the one shot is fed to a driver controlling the relay R-2 on the programming panel 59. Three typical motion detector circuits 54 are used in connection with the three ultrasonic sensors 10, 11 and 12. Each motion detector circuit 54 comprises the timing flip-flop T and integrating amplifier 62 connected to the reset output of flip-flop T and followed by a Schmidt trigger 63. The Schmidt trigger 63 has an adjustable threshold which can be set to the level of the output of the integrating amplifier 62 corresponding to a lack of movement in front of the camera. The outputs of the three motion detectors 54 are ored through gate 64 and the resulting signal L energizes a relay R-1 on the interface panel 59. The program panel 59 comprises a series of terminals, some of which are connected to the contact terminals of relays R-1 and R-2. A second set of terminals leads to the camera 5, the flash unit 9, the audible alarm 51 and external connections for the operation of remote alarms. A third set of terminals is connected to the input and output of an adjustable delay circuit 60. This delay circuit may be interposed between any one of the relay contacts and the alarms, camera or flash lines. Jumper cables are provided for connecting those terminals according to the user's requirements. The power on/off relay R-3 is controlled by a multi-key coded switch 16. The sequence required to either turn the system on or off is programmed by connections between the switch 16 terminals and the input terminals of the encoder circuit 65. The encoder 65 comprises three DC flip-flops 66, 67 and 68 which must be set sequentially in order to de-energize relay R-3. As an example, the wiring of switch 16 illustrated in FIG. 9 requires that switches 2, 4 and 3 be sequentially activated. If the sequence is changed or if switches 1 or 5 are pushed, the DC flip-flops are reset and the system is or remains energized. The coded switch 16 which could be remotely installed, is the only control operable without opening the housing 3. An indicator 8 is lit when the system is energized. The program panel 59 and the coded switch wiring must be done on the printed circuit board 17 located inside the enclosure 3. The flow diagram of FIG. 8 illustrates the waveforms at the various points in the system.

While the preferred embodiment of the invention has been described and modifications thereto have been suggested, other embodiments may be designed in accordance with the invention and within the scope of the appended claims.

What is claimed is:

1. An automatic focusing assembly for adjusting the objective of a camera in response to the movement of a body within the camera field of vision which comprises:

means for periodically emitting an ultrasonic signal over an area within said field of vision;

means for detecting the echo of said ultrasonic signal reverberating from said area;

means for generating a first binary-coded signal proportional to the elapsed time between said ultrasonic signal and the detection of said reverberating echo;

means for generating a second binary-coded signal proportional to the setting of said objective;

means for detecting coincidence between said first and second binary-coded signals;

a first gear coupled to said objective;

a pair of semi-circular gears alternately engaging said first gear;

an uni-directional electrical motor; means for coupling said electrical motor to said pair of semi-circular gears and means, responsive to said means for detecting coincidence for de-energizing said motor.

2. The device claimed in claim 1 which further includes means for triggering the camera in response to said means for detecting coincidence.

* * * * *